(12) United States Patent
Kolb et al.

(10) Patent No.: US 6,225,008 B1
(45) Date of Patent: May 1, 2001

(54) ELECTRODE HAVING AN OVERLAYMENT AND ASSOCIATED FABRICATION PROCESS

(75) Inventors: Eric S. Kolb; Denis G. Fauteux, both of Acton, MA (US)

(73) Assignee: Mitsubishi Chemical Corporation (JP)

( * ) Notice: Subject to any disclaimer, the term of this patent is extended or adjusted under 35 U.S.C. 154(b) by 0 days.

(21) Appl. No.: 09/182,707

(22) Filed: Oct. 29, 1998

(51) Int. Cl.$^7$ ..................................................... H01M 2/14
(52) U.S. Cl. ......................... 429/233; 429/137; 29/623.5
(58) Field of Search ................................. 429/132, 136, 429/137, 233; 141/32; 205/57; 29/623.5

(56) References Cited

U.S. PATENT DOCUMENTS 6,013,386 * 1/2000 Lewin et al. .............................. 429/30

* cited by examiner

Primary Examiner—Stephen Kalafut
Assistant Examiner—M. Wills
(74) Attorney, Agent, or Firm—Factor & Partners

(57) ABSTRACT

A process for fabricating an electrode for use in an electrochemical cell comprising the steps of: a) associating a current collector with an active material having a surface; b) applying an overlayment material to a substrate; c) associating the overlayment material with at least a portion of the surface of the active material; d) at least alternatively partially curing the active material; and e) removing the substrate and, in turn transferring at least a portion of the overlayment material to at least a portion of the active material. The electrode produced is used in an electrochemical cell comprising a current collector, an electrode active material having a surface, and an overlayment material associated with at least a portion of the active material. The electrode further includes means for increasing compatability of the electrode with an associated electrolyte.

7 Claims, 2 Drawing Sheets

ELECTRODE HAVING AN OVERLAYMENT AND ASSOCIATED FABRICATION PROCESS

BACKGROUND OF THE INVENTION

1. Field of the Invention

The present invention relates in general to electrode materials, and more particularly, to an electrode associated with an overlayment material which, among other things, modifies the surface properties of the electrode and, in turn, increases the compatability of the electrode with an associated electrolyte. The present invention is further directed to a process for fabricating an electrode having such an overlayment.

2. Background Art

Lithium ion batteries have been known in the art for several years. Furthermore, high performance, multi-component electrodes associated with electrolytes for use in lithium ion batteries are likewise well known. While the performance characteristics of such electrodes associated with various electrolytes have been commercially acceptable, the compatability characteristics between the electrodes and electrolytes remain problematic. Such incomparability is indicative of poor adhesion/contact between the electrode and the electrolyte, which, among other things, adversely affects the electrochemical performance of an associated cell.

SUMMARY OF THE INVENTION

The present invention is directed to a process for fabricating an electrode as well as an electrochemical cell. The process for fabricating the electrochemical cell comprises the steps of fabricating a first electrode and a second electrode, wherein fabricating at least one of the first and second electrodes includes the steps of: a) associating a current collector with an active material having a surface; b) applying an overlayment material to a substrate; c) associating the overlayment material with the surface of the active material; d) alternatively curing the active material; e) removing the substrate and, in turn transferring the overlayment material to the active material; and f) associating an electrolyte with the first electrode.

In a preferred embodiment of the invention, the process further comprises the step of associating a second electrode adjacent the electrolyte.

In another preferred embodiment of the invention, the step of transferring the overlayment material includes the step of modifying the surface properties of the electrode, and the step of modifying includes the step of increasing adhesion/compatability of the electrode with an associated electrolyte.

In yet another preferred embodiment of the invention, the step of associating the overlayment material with the surface of the active material includes the step of interacting the overlayment material with a solvent contained within the active material.

In an additional preferred embodiment of the invention, the step of applying the overlayment material to a substrate includes the step of doping the overlayment material with an additive. In this embodiment the additive is preferably a salt, polymerization initiator or a SEI forming additive.

In yet another preferred embodiment of the invention, the overlayment material is substantially inert with the remainder of the electrode.

The present invention is also directed to an electrode as well as an electrochemical cell. The electrode generally comprises a current collector, an electrode active material having a surface, an overlayment material associated with at least a portion of the active material, and means for increasing compatability of the electrode with an associated electrolyte.

In a preferred embodiment of the invention, the overlayment material is doped with an additive. In this embodiment, the additive is preferably a salt, polymerization initiator or a SEI forming additive.

In yet another preferred embodiment of the invention, the overlayment material is substantially inert with the remainder of the cell.

BRIEF DESCRIPTION OF THE DRAWINGS

The invention will now be described with reference to the drawings wherein.

DETAILED DESCRIPTION OF THE DRAWINGS

Figure 1:
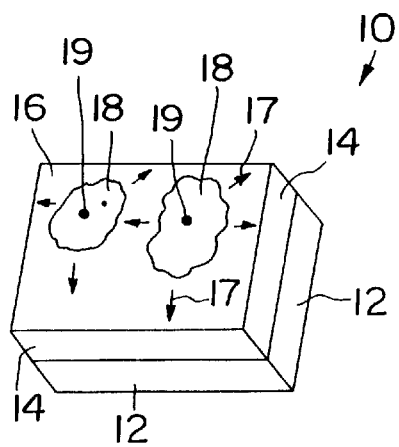
FIG. 1 is a fragmentary perspective view of a prior art electrode.

While this invention is susceptible of embodiment in many different forms, there is shown in the drawings and will herein be described in detail a specific embodiment with the understanding that the present disclosure is to be considered as an exemplification of the principles of the invention and is not intended to limit the invention to the embodiment illustrated.

Referring now to the drawings and to FIG. 1 in particular, prior art electrode 10 is shown as generally comprising current collector 12 and active material layer 14. Active material layer 14 includes surface 16, which is commonly associated with electrolyte 18. It will be understood that components 12, 14, and 16 of electrode 10 are fabricated from conventional materials and are readily known to those having ordinary skill in the art.

Figure 2:
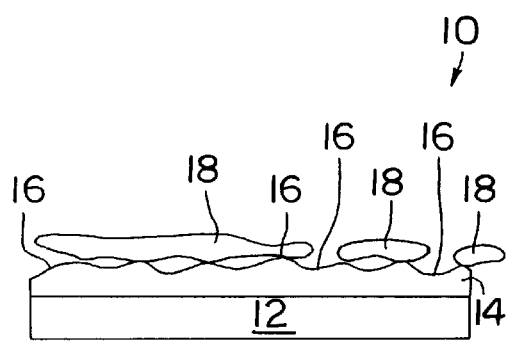
FIG. 2 is a side elevational view of the prior art electrode in FIG. 1.

As shown in FIGS. 1 and 2 (also prior art), surface 16 of active material layer 14 is associated with electrolyte 18. Nevertheless, the physical properties and mechanical configuration of surface 16 is such that electrolyte 18 does not result in optimal contact and adhesion (hereinafter sometimes referred to as "compatability") between the electrode and electrolyte interface. Furthermore, surface dewets, dimples, and/or irregularities 19 (FIG. 1) were observed on surface 16.

Figure 3:
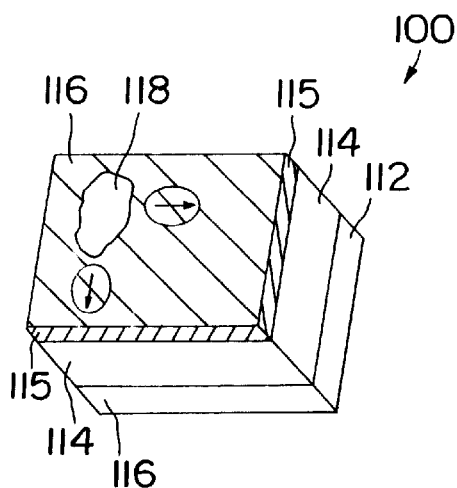
FIG. 3 is a fragmentary perspective view of an electrode in accordance with the present invention.

In comparison, and as shown in FIG. 3, electrochemical cell 100, of the present invention, generally comprises current collector 112, active material layer 114, and overlayment 115 having surface 116. Surface 116 of overlayment 115 is integrally associated with electrolyte 118.

Current collector 112, in the case of an anode, is preferably fabricated from a copper foil or mesh, while in the case of a cathode, the current collector is preferably fabricated from an aluminum foil or mesh— although any one of a number of conventional current collectors that would be known to those having ordinary skill in the art are likewise contemplated for use.

Active material layer 114 is preferably a paste comprising several components including, for example, in the case of an anode, a carbonaceous species such as graphite, a metallic species, a binder material, and at least one solvent such as polyethlyne oxide (hereinafter "PEO"), and, in the case of a cathode, a transition metal oxide (e.g. $Li_xM_yO_z$), a binder material and a solvent. It will be understood that other active material layers are well known in the art and any one of a number of active material compositions are suitable for use in accordance with the present invention.

Overlayment 115 comprises, for illustrative purposes only polymethyl-methacrylate, ("PMMA"). Of course, other polymeric, thermoplastic overlayments including, but, not limited to, polyacrelate, polyester, polycarbonate and polystyrene are likewise contemplated for use, so long as the particular overlayment: modifies the surface of the active material to, in turn, increase adhesion/compatability between the electrode and an associated electrolyte, and is electrochemically compatible with the remainder of the cell.

Figure 4:
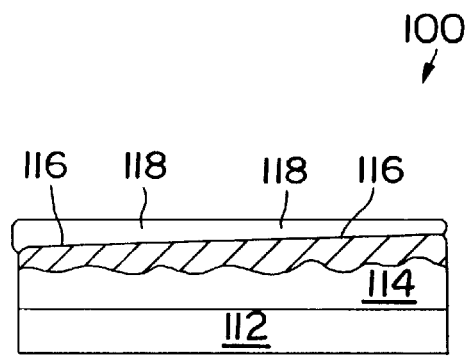
FIG. 4 is a side elevational view of the present invention electrode of FIG. 3.

As shown in FIGS. 3 and 4, surface 116 of overlayment 115 and, in turn, electrode 110 is substantially modified so that an associated electrolyte 118 readily adheres to surface 116. Although not shown, it is likewise contemplated that overlayment 115 can be further associated beyond the surface of the active material and, additionally or alternatively, associated with components below the surface—via overlayment impregnation. Such impregnation components include, for example, the electrolyte, the current collector, and/or each of the components which comprise the active material of the electrode.

While not shown, it is also contemplated that overlayment 115 can be doped and/or charged with an additive, such as a salt, to assist in maintaining electronic conductivity, polymerization initiator or a SEI forming additive. To be sure, the type and number of conventional doping additives are virtually limitless and they are only restricted by their compatibility with the remainder of the components within or associated with the cell.

Figure 5:
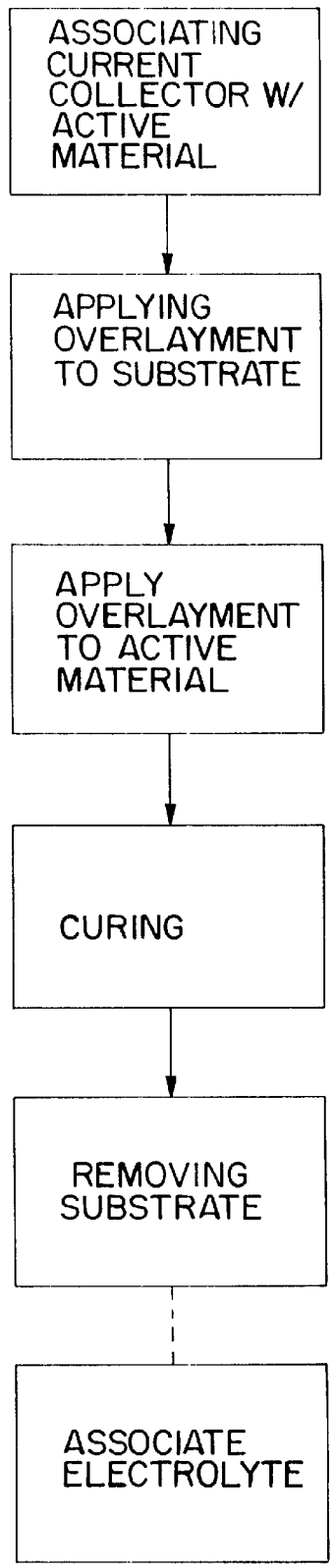
FIG. 5 is a schematic diagram of a process for fabricating an electrode in accordance with the present invention.

A process for fabricating an electrode in accordance with the present invention is schematically shown in FIG. 5, as generally comprising the following steps:

First, current collector 112 is associated with active material 114 by conventional techniques, such as, for example, spraying, dipping, coating, and/or spreading the active material onto the current collector. Second, overlayment 115 is applied onto a substrate. The substrate may comprise a piece of commercially available aluminized Mylar. Of course, several other substrates are suitable for use, so long as the substrate releasably retains the overlayment. Additionally, while overlayment 115 has been disclosed, for illustrative purposes only, as being associated with a substrate, it is likewise contemplated that the overlayment can be, for example, sprayed directly onto the active material surface without such a substrate. Moreover, as previously discussed, the overlayment may be doped with an additive, such as a salt, polymerization initiator or a SEI forming additive, prior to and/or after application to the substrate.

Third, the overlayment associated with the substrate is applied to the surface of the active material of the electrode, and subsequently the active material is at least partially cured. Curing may occur in many different forms such as, thermal curing, pressure curing, or specific wavelength curing including, infra red, ultra violet, and/or micro wave curing. During the curing step it is believed that solvents contained within the conventional active material layers interact with the overlayment and, in turn, increase its compatability with the active material surface. Of course, if the overlayment is associated with an additive, such as a polymerization initiator, the additive may cross-link or otherwise react with components within the cell. For example the initiating additive may crosslink with the surface of the active material and/or with the electrolyte contained therein.

Fourth, the substrate is removed from the electrode and the overlayment is, in turn, substantially transferred to the active material. During the removal of the substrate a substantial portion of the overlayment is disassociated with the substrate and left on the surface of the active material in a substantially increased compatable state. During the transfer, the overlayment modifies the surface of the electrode—providing it with substantially increased compatability characteristics, such as increased wettability, with the electrolyte which is subsequently associated therewith.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A process for fabricating an electrochemical cell comprising the steps of:
    fabricating a first electrode and a second electrode, wherein fabricating at least one of the first and second electrodes includes the steps of:
        associating a current collector with an active material having a surface;
        applying an overlayment material to a substrate;
        associating the overlayment material with at least a portion of the surface of the active material;
        removing the substrate and, in turn transferring at least a portion of the overlayment material to at least a portion of the active material; and
    associating an electrolyte with the first electrode.

2. The process according to claim 1, further comprising the step of associating a second electrode adjacent the electrolyte.

3. The process according to claim 1, wherein the step of transferring at least a portion of the overlayment material includes the step of modifying the surface properties of the electrode, and the step of modifying includes the step of increasing adhesion of the electrode with an associated electrolyte.

4. The process according to claim 1, wherein the step of associating the overlayment material with the surface of the active material includes the step of interacting the overlayment material with a solvent contained within the active material.

5. The process according to claim 1, wherein overlayment material comprises an additive.

6. The process according to claim 5, wherein the additive is selected from at least one of the group consisting of a salt, polymerization initiator or a SEI forming additive.

7. The process according to claim 1, wherein the overlayment material is substantially inert with the remainder of the electrode.

* * * * *